(12) United States Patent
Ehrhart et al.

(10) Patent No.: US 6,750,576 B2
(45) Date of Patent: Jun. 15, 2004

(54) PERMANENT MAGNET INDUCED ELECTRIC MACHINE AND METHOD FOR OPERATING SUCH A MACHINE

(75) Inventors: Peter Ehrhart, Munich (DE); Roland Hagenlocher, Planegg (DE)

(73) Assignee: Magnet-Motor Gesellschaft fur Magnetmotorische Technik MBH (DE)

( * ) Notice: Subject to any disclaimer, the term of this patent is extended or adjusted under 35 U.S.C. 154(b) by 0 days.

(21) Appl. No.: 10/204,509

(22) PCT Filed: Feb. 21, 2001

(86) PCT No.: PCT/EP01/01986
§ 371 (c)(1),
(2), (4) Date: Dec. 13, 2002

(87) PCT Pub. No.: WO01/63720
PCT Pub. Date: Aug. 30, 2001

(65) Prior Publication Data
US 2003/0098626 A1 May 29, 2003

(30) Foreign Application Priority Data
Feb. 21, 2000 (DE) .......................................... 100 07 777

(51) Int. Cl.⁷ .............................................. H02H 7/122
(52) U.S. Cl. ................ 310/68 R; 310/68 E; 363/56.03; 361/23
(58) Field of Search .............................. 310/68 R, 68 D, 310/68 E, 179; 363/56.03; 361/23, 31, 100

(56) References Cited

U.S. PATENT DOCUMENTS

| | | | | |
|---|---|---|---|---|
| 3,040,224 A | | 6/1962 | Piltz et al. | |
| 4,359,657 A | * | 11/1982 | Matsumoto et al. | ... 310/156.26 |
| 4,537,174 A | * | 8/1985 | Nagasawa | ................... 123/604 |
| 4,689,508 A | * | 8/1987 | Yang | ......................... 310/68 E |
| 4,750,077 A | * | 6/1988 | Amagasa | ...................... 361/18 |
| 5,436,819 A | | 7/1995 | Mikami et al. | |
| 5,469,351 A | | 11/1995 | Masrur et al. | |
| 5,675,203 A | * | 10/1997 | Schulze et al. | ............. 310/113 |
| 5,757,596 A | | 5/1998 | Weber et al. | |
| 6,097,124 A | * | 8/2000 | Rao et al. | .............. 310/156.26 |
| 6,297,574 B1 | * | 10/2001 | Schob et al. | ................ 310/90.5 |

FOREIGN PATENT DOCUMENTS

| | | |
|---|---|---|
| DE | 1156166 | 10/1963 |
| DE | 3432845 | 3/1986 |
| DE | 19758128 | 7/1998 |
| DE | 19835576 | 11/1999 |
| JP | 10075596 | 3/1998 |
| JP | 11008992 | 1/1999 |
| WO | WO 96/27942 | 9/1996 |

* cited by examiner

*Primary Examiner*—Thanh Lam
(74) *Attorney, Agent, or Firm*—Bachman & LaPointe, P.C.

(57) ABSTRACT

If an interturn short-circuit occurs in a stator coil winding of a permanent magnet excited electric machine, a short-circuit current is produced there that results in an electrically induced magnetic alternating flux which corresponds in its value to the permanent magnetic alternating flux flowing through the respective winding and which is opposite in phase. Such a sort-circuit current could lead to burn-off of the turn due to its considerable strength and the loss associated therewith. To prevent this, the invention suggests in case of detection of an interturn short-circuit, to entirely short-circuit at least the coil affected by the short-circuit or to apply thereto a corresponding in-phase current and to reduce the excessive short-circuit current in the individual turn or in the individual turn section by way of this overall short-circuit current in the coil. It is thus possible to prevent burn-off of the respective turn part.

18 Claims, 2 Drawing Sheets

PERMANENT MAGNET INDUCED ELECTRIC MACHINE AND METHOD FOR OPERATING SUCH A MACHINE

BACKGROUND OF THE INVENTION

The invention relates to a permanent magnet excited electric machine, comprising:

a rotor having one or more permanent magnets;

a stator having one or more coil windings; and an electronic switching means for coupling current into the coils and/or for coupling out current from the coils.

Such machines are generally known. Usually, the rotor is the exciting part carrying permanent magnets, which is arranged in a predetermined position so as to be rotatable in relation to the stator. With the aid of the electronic switching means, energy is coupled into the coils, for example, from a direct voltage intermediate circuit so as to operate the machine as a motor. In the generator-mode of operation, the electrical energy generated in the individual coil windings by rotation of the rotor is coupled out via the electric switching means.

According to Faraday's law of induction, a voltage is induced in the individual coil turns, and the sum of the individual turn voltages is present at the terminals of the coil windings.

If, with the machine running, a short circuit occurs in a turn or in or across several turns of a stator winding, the magnetic alternating flux flowing through the coil windings causes a short-circuit current in the shorted turn or turns.

In accordance with Lenz's law, the short-circuit current has a strength according to which the permanent magnetic alternating flux is eliminated. The magnetic alternating flux induced by the short-circuit current thus has the same value as the alternating flux caused by the permanent magnets and is of opposite phase in relation to the latter.

The short-circuit currents flowing in one or more or across several short-circuited turns are in excess of the nominal coil currents by a multiple, and there are thus arising considerable thermal losses. As a rule, the stator windings then cannot be cooled sufficiently, thus causing burning off of the particular turn or turn portion in the stator winding.

SUMMARY OF THE INVENTION

It is the object of the invention to develop a permanent magnet excited electric machine of the type mentioned in such a manner that, in case of an interturn short-circuit, destruction of the turn or turn section affected by the short-circuit can be prevented.

In addition thereto, a method of operating a permanent magnet excited electric machine is to be indicated through which, in the event of an interturn short-circuit, destruction of the shorted turn is avoided.

To meet the object indicated hereinbefore, the electric machine according to the invention is provided with a short-circuit detection means for detecting a short-circuit in one or more turns of a coil, and a compensation means for effecting a compensation current flow in at least that coil that contains the short-circuited turn.

In a method of operating a permanent magnet excited electric machine having the features indicated at the outset, the invention provides for the following steps:

monitoring each coil so as to detect a possible interturn short-circuit in the coil, and in the event of a short-circuit, effecting a compensation current flow in at least that coil that contains the short-circuited turn.

The invention is based on the finding that, in the event of an interturn short-circuit, it is indeed not possible to prevent the generation of a short-circuit current resulting in an electrically induced magnetic alternating flux corresponding in value to the permanent magnetic alternating flux, but that this short-circuit current may be distributed also to such turns that are not affected by the short-circuit, but are magnetically coupled with the turn affected by the short-circuit.

In an embodiment of the invention, upon detection of a short-circuit in a turn or a turn section of a coil winding, the coil concerned is short-circuited at the terminals thereof, so that a short-circuit current arises in the entire coil that results in an electrically induced magnetic alternating flux corresponding in its value to the permanent magnetic alternating flux and being of opposite phase relative to the same. Due to this process, the turn affected by the short-circuit is relieved. The short-circuit current of the affected turn is reduced considerably, so that the losses caused by the "distributed" short-circuit current can be compensated by the coolants provided so as to thus prevent burn-off of the affected turn.

Especially with electric machines having a stator composed of individual coils that are linked to each other in weakly magnetic manner only, the short-circuit current flowing through the entire coil corresponds approximately to the maximum operating current flowing through the coil winding during normal operation. Thus, the cooling provided for the normal operating current is sufficient also in the event of an interturn short-circuit for compensating the thermal losses due to the short-circuit current flowing in the affected turn as well as the short-circuit current flowing in the remainder of the coil winding.

In the event of a short-circuit, the machine can be brought to a standstill either rapidly and in uncontrolled manner or slowly and in controlled manner—depending on the particular application. In case of an electric machine with individual coils, it is possible in the event of an interturn short-circuit that the affected coil is short-circuited, but the remaining coils can be controlled as in normal operation, i.e. controlled deceleration of the motor can be achieved. However, it is also possible that one or more additional coils are short-circuited, up to the extreme case that all coils are short-circuited. In that event, extremely rapid stopping of the machine takes place which, however, is indeed tolerable in some cases.

The initiation of a compensation current flow, i.e. of a short-circuit current in the part of one or more coils not affected by the interturn short-circuit, can be realized in terms of circuit technology preferably by a switching means between the terminals of the coil winding. With the aid of a relay or a contactor, the short-circuit of the stator winding containing the turn part affected by the short-circuit then takes place. In this respect, it is particularly advantageous that the then flowing short-circuit current automatically has the correct phase with respect to the short-circuit current in the affected turn.

As an alternative to the switching means between the terminals of the coil winding or also as a supplementation of such a switching means, the compensation means may also be constituted by the electronic switching means that is present anyway and controls coupling in and coupling out of the currents into the coil winding and from the coil winding, respectively. The electric machine usually comprises—both as motor and as generator—an electronic control means that feeds the coil winding from a direct voltage intermediate circuit or couples energy from the coil winding into a direct voltage intermediate circuit at the appropriate time. In the event of a short-circuit, this electronic switching or control means then is set in particular to continuous current passage. The current flow in the electronic control means then corresponds approximately to the maximum nominal operating current in normal operation of the machine. If there is provided a separate switching means, e.g. a relay or contactor, for short-circuiting the stator, the control means is opened after closing of this switch for short-circuiting the stator winding.

If the compensation current flow is effected or initiated with the aid of the electronic control means, the latter may feed actively controlled current into the coil inflicted with the short-circuit, with the current direction then being set such that the current flows in-phase with respect to the short-circuit in the affected winding. The electronic switching or control means not belonging to the short-circuited coils, or also part of these means, then operate as if the machine were operating in the normal mode.

As mentioned hereinbefore, it is possible specifically with an electric machine with individual coils that one, several or all individual coils are short-circuited or have a compensation current applied thereto in case a coil is affected by an interturn short-circuit. The application of a compensation current to all coils results in deceleration of the machine with the highest possible braking moment. This may have to be tolerated or even be desired in some cases, but may lead to dangerous situations in other cases, for example when the electric machine is used as a drive for a vehicle. In that case, it is to be preferred to act only on the coil affected by the interturn short-circuit—and, if applicable, on one or several additional coils—whereas the remaining coils of the machine are controlled so as to achieve controlled deceleration of the machine.

While the above statements relating to the invention and specific and preferred embodiments of the invention are concerned with the generation of compensation current flows in the event of an interturn short-circuit, the recognition or detection of an interturn short-circuit shall be discussed in more detail in the following. As short-circuit detection means, it is possible to provide e.g. a temperature sensor for each coil winding. Due to the fact that an interturn short-circuit leads to a short-circuit current with correspondingly rapid generation of dissipated heat, this dissipated heat can be utilized as indication for an interturn short-circuit. This measure in particular has the advantage that temperature sensors possibly may be provided anyway for the normal operation of the machine, i.e. that already existing temperature sensors may be used for recognizing or detecting interturn short-circuits. The output signals of the temperature sensors are detected by a short-circuit detector/compensation control and converted to control signals for causing short-circuit currents, e.g. by closing the aforementioned switches between the terminals of the coil windings or by through-control of the electronic switching valves belonging to the affected coil winding.

In a modified embodiment, the short-circuit detection means comprises an inductance measuring means for detecting the respective coil inductance. In the event of an interturn short-circuit, the current curve or flow in the connecting lines connected to the coil winding changes. With the aid of current sensors coupled to these lines, the current in the lines can be detected. By differentiating the current flow and comparing the derivative value for the current thus obtained with a threshold value, it is possible to ascertain current curve edges that have become steeper. Extremely steep edges in the current curve indicate a reduction of the coil inductance—which is due to an interturn short-circuit. The evaluation of the coil currents for detecting inductance losses in the individual coils may take place in a central short-circuit detector/compensation control, but preferably evaluation and short-circuit generation take place directly in the electronic control means of the coil concerned.

As already mentioned hereinbefore, particularly simple and uncomplicated compensation in case of interturn short-circuits can be achieved when the stator is composed of individual coils. The outputs of the coils may be electrically linked together and may be operated correspondingly by the electronic switching means. However, it is particularly preferred to use the invention in case of such machines in which the stator is composed of mutually independent individual coils. Each coil has a single-phase inverter separately associated therewith. The detection of short-circuits and initiation of compensation currents take place separately in the branch of the affected coil. This can take place either in completely independent manner of the remaining parts of the stator, or it is possible to provide for coordinated measures with the aid of a central means.

BRIEF DESCRIPTION OF THE DRAWING

In the following, embodiments of the invention will be elucidated in more detail by way of the drawings in which

FIG. 2b shows a partial flow diagram of an alternative embodiment of the method illustrated in FIG. 2a.

DETAILED DESCRIPTION OF THE PREFERRED EMBODIMENTS

Figure 1:
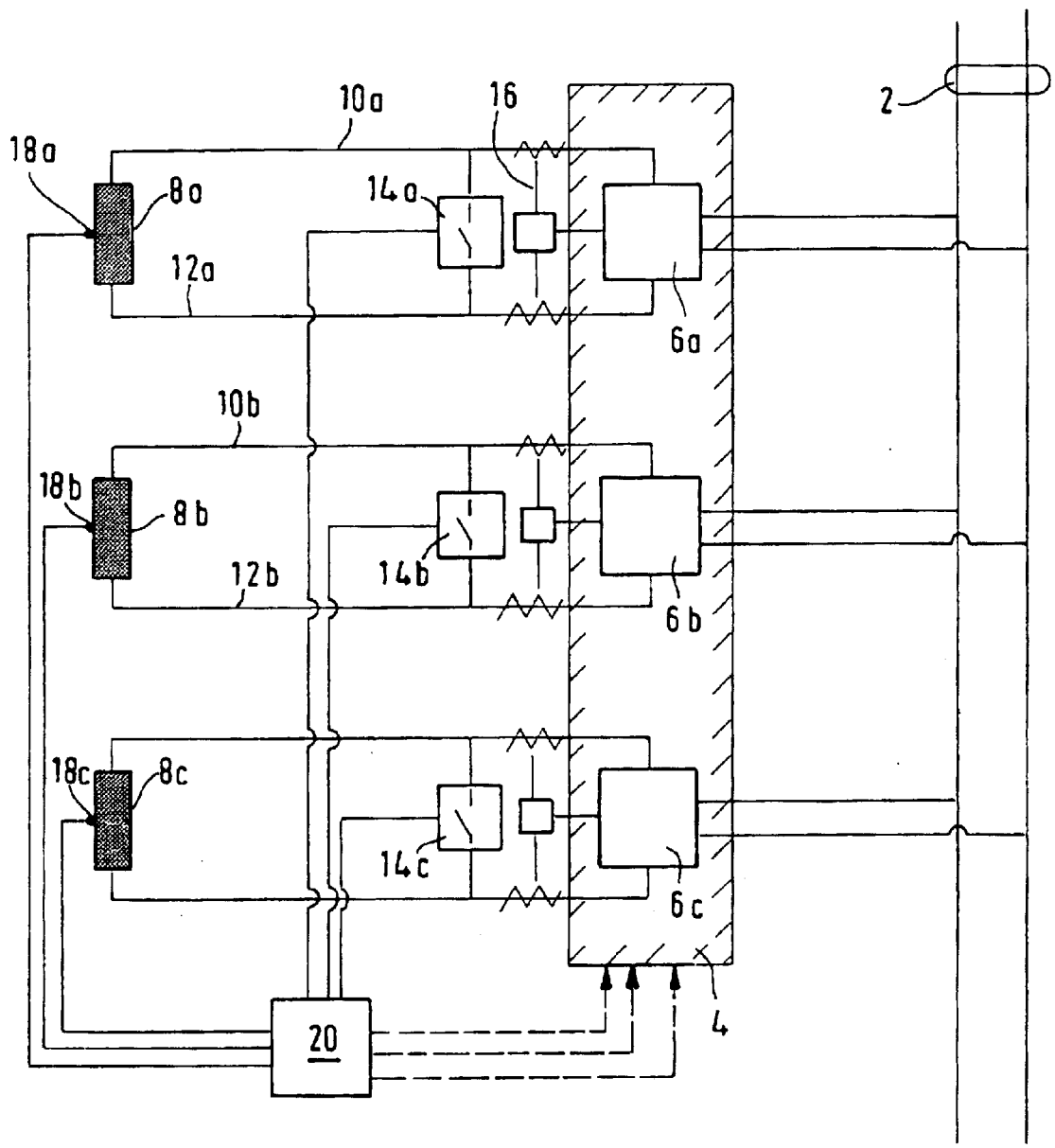
FIG. 1 shows a block circuit diagram of the electric circuit of a permanent magnet electric machine according to the invention.
Figure 3:
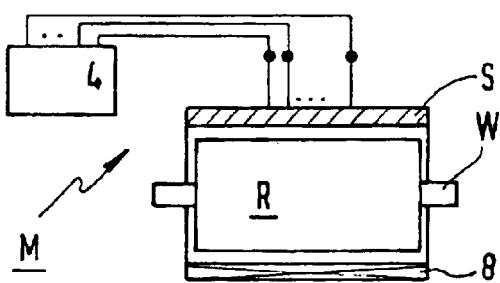
FIG. 3 shows a highly schematic representation of a permanent magnet excited electric machine.

Before discussing the block diagram of the electric circuit of a permanent magnet excited electric machine according to the invention, as shown in FIG. 1, the main constituent parts of such a machine shall be elucidated first by way of FIG. 3.

As can be seen in FIG. 3, a permanent magnet excited electric machine, designated M in its entirety, consists of a stator S comprising a stationary, cylindrical stator S containing several coils 8, and of a rotor R arranged in said stator S so as to be rotatable on a shaft W. The coils 8 have a control and switching means 4 connected thereto via schematically indicated lines.

The rotor R, in a manner known per se, consists of a plurality of circumferentially distributed permanent magnets.

The mode of operation of such permanent magnet excited electric machines is known per se. The machines can operate optionally as motor and as generator; to this end, an electronic switching means provided in the operational control circuit C feeds current into the coil windings and couples out current from the coil windings, respectively.

FIG. 3 shows as an example a machine having an internal rotor. Another example would be a machine with external rotor, the construction of which is basically known as well.

FIG. 1 shows in a block diagram the essential components of the electric part of the permanent magnet excited electrical machine according to the invention.

A direct voltage intermediate circuit 2 serves to operate three coils designed as individual coils 8a, 8b and 8c via an electronic control or switching means 4.

In the present embodiment, the individual coils 8a to 8c are independently operable members of the electric machine, with the expert recognizing, however, that the stator may have a virtually arbitrary number of coils that may be designed as independent individual coils or as interlinked coil assembly.

In case of operation as electric motor, individual controllers 6a, 6b and 6c within the electronic switching means 4, which constitute one-phase inverters, supply energy into the respective coils 8a to 8c via connecting line pairs 10a, 12a; 10b, 12b . . . .

In the coil winding of each coil 8a, 8b and 8c, there is provided a temperature sensor 18a, 18b and 18c, respectively. The temperature signals generated by the temperature sensors are passed to a short-circuit detector/compensation control 20. In case of a short-circuit in a turn or a turn part of one of the coils, the associated temperature sensor delivers a signal indicating a considerably increased temperature in the coil winding concerned, which hints at an interturn short-circuit.

It shall be assumed in the following that there is an interturn short-circuit present in the coil winding of coil 8a. As a consequence of the interturn short-circuit, the temperature sensor 18a belonging to coil 8a delivers to the short-circuit detector/compensation control 20 a signal that signals the short-circuit. Circuit 20 then generates a closing signal for a relay 14a which short-circuits the terminals of coil 8a, i.e. the two connecting lines 10a and 12a. There is then flowing a short-circuit current in coil 8a, with the value thereof causing an electrically induced magnetic alternating flux corresponding to the permanent magnetic alternating flux present in the coil with the interturn short-circuit. The entirety of the short-circuit current flowing through coil 8a corresponds approximately to the normal maximum operating current flowing through coil 8a. The cooling feature designed for such operating currents in the region of the coil 8a thus is adapted to sufficiently carry off the dissipated heat caused by the short-circuit current. Without the short-circuit of the entire coil 8a, a short-circuit current would have been created only in the turn affected by the short-circuit or the affected turn section, which would have given rise to an electrically induced magnetic alternating flux corresponding in its value to the permanent magnetic alternating flux with opposite phase. Due to the "distribution" of the short-circuit current to the entirety of the coil 8a, the turn section concerned thus is kept from burning off. Upon detection of a short-circuit by the short-circuit detector/compensation circuit and triggering of the compensation current in coil 8a, an error reporting signal may be initiated signaling the short-circuit in the electric machine.

As an alternative—and also in addition to—the initiation of the compensation current in the manner described hereinbefore, i.e. by detection of a short-circuit by temperature sensor, a short-circuit in a turn section of coil 8a can also be detected by a change in current curve in the connecting lines 10a, 12a.

In the block circuit diagram of FIG. 1, there are provided current sensors 16 in each branch of coils 8a, 8b and 8c. In case of a short-circuit e.g. in coil 8a, the coil inductance of coil 8a decreases. Due to the reduced coil inductance, the edges of the current curves become considerably steeper. When forming the time derivative of the current curve detected by current sensor 16 and comparing the signal thus gained with a threshold value, it is possible to detect an interturn short-circuit in the affected coil 8a. For initiating a compensation current, a circuit contained in controller 6a can perform a differentiation of the current curve so as to optionally switch the electronic switching elements within the controller 6a to continuous current flow and thus effect the short-circuit of coil 8a.

If—as assumed in the preceding example—an interturn short-circuit is detected in coil 8a, only the coil 8a is short-circuited in accordance with the above example, be it by closure of a relay 14a or by setting of controller 6a to continuous current passage, with relay 14a being controlled by the central short-circuit detector/compensation control 20 and the short-circuit current being caused internally by the controller 6a by way of a signal delivered from current sensor 16.

However, in a further preferred embodiment of the invention it is possible instead of short-circuiting of the affected coil 8a only, to operate also an additional coil or several coils with a compensation current. In the arrangement of FIG. 1 having three individual coils, it is possible in the extreme case to short-circuit all coils 8a to 8c, resulting in very rapid stopping of the rotor. If, for example, in case of a short-circuit in a winding of coil 8a, the coil 8b is short-circuited in addition, whereas the coil 8c continues to operate in the normal mode, it is possible to obtain slower deceleration of the rotor. Such a coordinated mode of operation in the event of a short-circuit in one of the coils 8a to 8c is indicated by control lines shown in broken lines to the lower right in FIG. 1, with the control lines leading from the central short-circuit detector/compensation control 20 to the electronic switching means 4 including the individual controllers 6a to 6c.

Figure 2A:
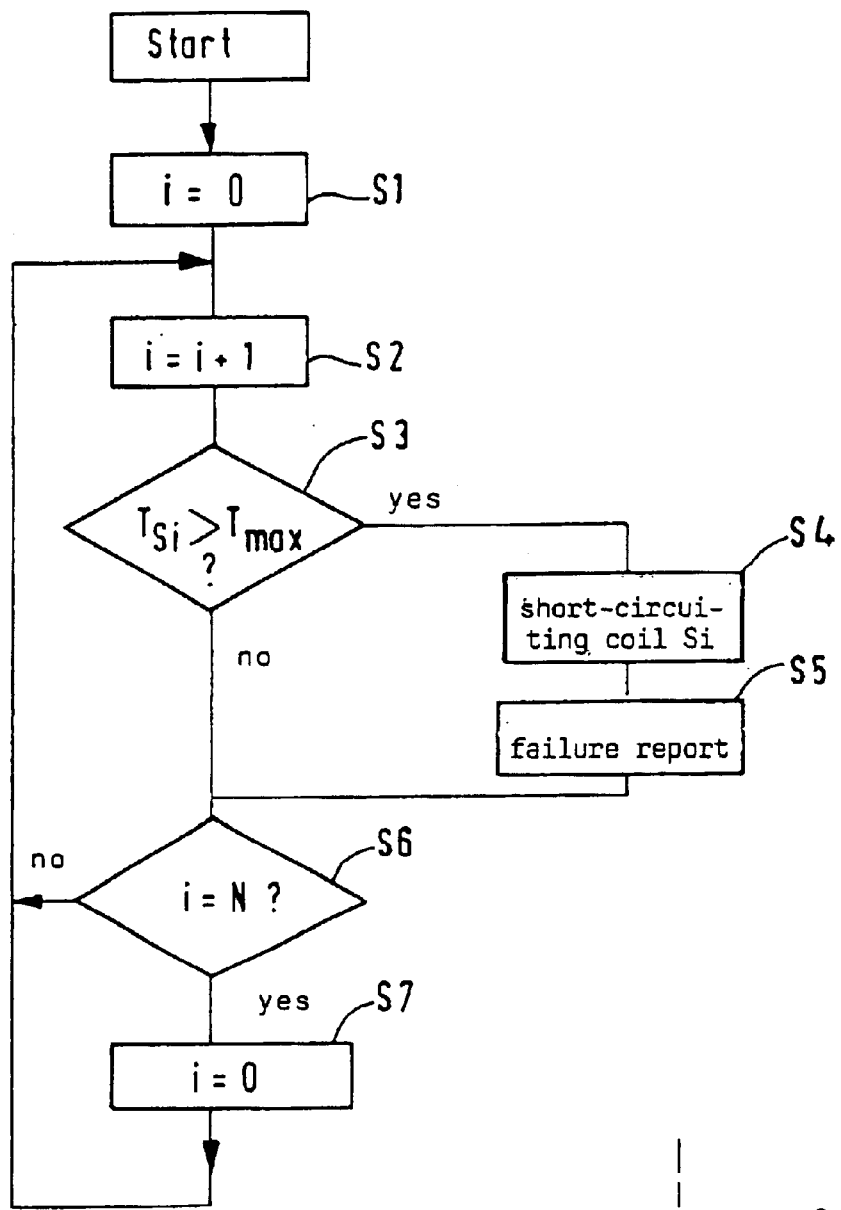
FIG. 2a shows a schematic flow diagram illustrating monitoring and detection of an interturn short-circuit in a permanent magnet excited electric machine according to the invention, having N individual coils.

FIG. 2a shows in a schematic flow diagram the course of the monitoring operation for detecting a short-circuit.

In step S1 of FIG. 2a, a counter i is set to zero, and in following step S2 is incremented by 1. i stands for one of a plurality of individual coils 1, . . . N of an electric machine.

In step S3, polling of the temperature $T_{Si}$ of coil i takes place. If the temperature is in excess of a threshold value Tmax, the coil Si concerned is short-circuited in step S4, and a failure report is given thereafter in step S5.

The polling step S6 guarantees that each of the coils is examined successively as regards a short-circuit. Upon examination of all coils, the sequence is restarted from the beginning in that index i is reset to zero in step S7.

Figure 2B:
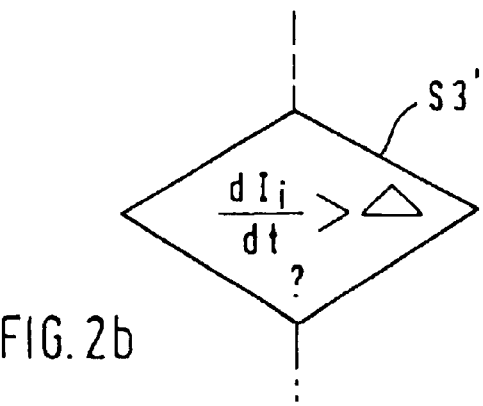

As already mentioned hereinbefore, the detection of a short-circuit may also take place by differentiation of the current curve or flow in the leads of the affected coil. To this end, as indicated in FIG. 2b by step S3', the differential quotient dIi/dt is formed and compared to a threshold value Δ. In case of very steep current edges, threshold value Δ is exceed. The steep current edges are an indication for reduced coil inductance, with the latter being caused in turn by an interturn short-circuit.

What is claimed is:

1. A permanent magnet excited electric machine, comprising:
   a rotor having at least one permanent magnet;
   a stator having at least one coil with coil windings; and
   an electronic switching means for coupling current into the at least one coil and/or for coupling out current from the at least one coil, a short-circuit detection means for detecting a short-circuit in at least one turn of the at least one coil, and a compensation means for effecting a compensation current flow in at least that coil that contains the at least one short-circuited turn, so as to reduce the short-circuit current in the at least one short-circuited turn, and the electronic switching means feeding actively controlled current into the at least one coil inflicted with a short-circuit, with said current being directed such that said current flows in-phase with respect to the short-circuit current within the at least one turn inflicted with the short-circuit.

2. A machine according to claim 1, wherein the compensation means comprises a second switching means between the terminals of the at least one coil for short-circuiting same.

3. A machine according to claim 1, wherein the compensation means is a component part of the electronic switching means.

4. A machine according to claim 3, wherein the electronic switching means can be set to continuous current passage, so that a short-circuit results in the at least one coil.

5. A machine according to claim 1, wherein the compensation means effects a compensation current flow only in the at least one coil in which an interturn short-circuit is present.

6. A machine according to claim 1, wherein the compensation means effects a compensation current flow only in a partial quantity of the coils comprising the at least one coil with an interturn short-circuit.

7. A machine according to claim 1, further comprising a plurality of coils and said compensation means effecting a compensation current flow in all of the coils.

8. A machine according to claim 1, further comprising a plurality of coils and the electronic switching means continuing to operate at least part of the coils having no electric short-circuit in a normal mode of operation.

9. A machine according to claim 1, wherein the short-circuit detection means comprises temperature sensors within the coil windings.

10. A machine according to claim 1, wherein the short-circuit detection means comprises an inductance measuring means for measuring the coil inductance.

11. A machine according to claim 10, wherein the inductance measuring means is formed within the electronic switching means.

12. A machine according to claim 1, further comprising a plurality of stator coils in the form of individual coils that are electrically connected in interlinked manner and whose currents are coupled in and out, respectively, by the electronic switching means in correspondingly interlinked manner.

13. A machine according to claim 1, further comprising a plurality of stator coils, said stator coils being individual coils the currents of which are coupled in and out, respectively, by independently operating parts within said electronic switching means.

14. A method of operating a permanent magnet excited electric machine in the event of a short-circuit in at least one of a turn and a turn part of a coil, said machine comprising:

a rotor having at least one permanent magnet;

a stator having at least one coil with coil windings; and an electronic switching means for coupling current into the at least one coil and/or for coupling out current from the at least one coil, said method comprising the following steps:

monitoring each said coil for detecting a possible interturn short-circuit in the coil, in case of a short-circuit, effecting a compensation current flow in at least that coil that contains the short-circuited turn, so as to reduce the short-circuit current in the short-circuited turn, and supplying an actively controlled current in-phase in the affected coil as compensation current.

15. A method according to claim 14, further comprising said monitoring step comprises monitoring a coil by evaluation of the curve of the current in the coil.

16. A method according to claim 14, further comprising for monitoring the coil, detecting and evaluating the temperature.

17. A method according to claim 14, wherein said current supplying step comprises effecting a compensation current flow in a coil by setting the electronic switching means to continuous current passage.

18. A method according to claim 14, wherein said current supplying step comprises effecting a compensation current flow in the coil affected by a short-circuit and optionally in at least one additional coil, while the electronic switching means continues to operate remaining coils in a normal mode of operation.

* * * * *